United States Patent
Chen

(10) Patent No.: US 6,965,548 B2
(45) Date of Patent: Nov. 15, 2005

(54) METHOD OF UNBALANCED DISC DETECTION

(75) Inventor: Yung-Chien Chen, Taipei (TW)

(73) Assignee: AOPEN Inc., Taipei Hsien (TW)

( * ) Notice: Subject to any disclaimer, the term of this patent is extended or adjusted under 35 U.S.C. 154(b) by 638 days.

(21) Appl. No.: 10/196,150

(22) Filed: Jul. 15, 2002

(65) Prior Publication Data

US 2003/0206508 A1    Nov. 6, 2003

(30) Foreign Application Priority Data

May 6, 2002  (TW) ................. 91109360 A

(51) Int. Cl.[7] .............................. G11B 7/00
(52) U.S. Cl. ................. 369/44.32; 369/53.12; 369/53.14; 369/53.19

(58) Field of Search .............. 369/44.27, 44.28, 369/44.29, 44.32, 44.33, 44.34, 44.35, 44.41, 369/47.1, 47.18, 53.1, 53.12, 53.13, 53.15, 369/53.16, 53.18, 53.23, 59.1, 124.01, 124.15, 369/53.19

(56) References Cited

U.S. PATENT DOCUMENTS 6,377,527 B1 *  4/2002  Hirashima ............... 369/53.23
6,826,136 B1 * 11/2004  Jeong ...................... 369/47.44

* cited by examiner

Primary Examiner—Muhammad Edun
(74) Attorney, Agent, or Firm—Ladas & Parry LLP

(57) ABSTRACT

A method of unbalanced disc detection in a slim type optical drive. In the method of the present invention, the slim type optical drive obtains a first tracking count per round of the disc at a first rotation speed to obtain a first runout. Then, the optical drive obtains a second tracking count per round of the disc at a second rotation speed to obtain a second runout. Finally, deviation of the disc is assessed according to the first runout and the second runout, so that the disc can be determined to be a gravitationally eccentric disc or not.

4 Claims, 2 Drawing Sheets

METHOD OF UNBALANCED DISC DETECTION

BACKGROUND OF THE INVENTION

1. Field of the Invention

The present invention relates to a method of unbalanced disc detection, and particularly to a method of unbalanced disc detection in a slim type optical drive.

2. Description of the Related Art

Generally, an optical disc is designed to have a symmetrical shape, with its geometric and gravitational axis positioned on the center of the disc. However, in practical use, the disc may be not ideally symmetrical in shape or in weight due to material distribution defects or poor manufacturing. In this case, either the geometric and/or gravitational axes deviate from the center of the disc, producing a gravitationally and/or geometrically eccentric disc. If such a disc is disposed in the optical drive, imbalance occurs in the disc rotation due to the deviation of geometry or gravity, which generally leads to data retrieval failure. This will be further described in the following paragraph.

When the above-mentioned imbalance occurs in the disc rotation, a force due to this imbalance is generated and applied to the disc, which further leads to disc wobble and annoying noise in disc rotation. The disc wobble and the noise not only disturb the user, but also cause potential damage to the optical drive structure. If the optical drive is a slim type optical drive, which has a relatively small structure and is generally applied in notebooks or handhelds, the effect of the force due to this imbalance may be further aggravated.

The above-mentioned force due to the imbalance can be divided into a vertical force (i.e. direction of the center of the disc) and a horizontal force (i.e. direction parallel to the disc surface). Disc wobble is mainly caused by the vertical force, and axial force F between the rotational driving spindle and the holding mechanism of the optical drive and the disc is mainly caused by the horizontal force. In this case, if a disc with a weight M is applied, a relation between the axial force F and the weight M of the disc is shown as Equation (1):

$$Fm = M \times r \times \omega^2 \quad (1)$$

In Equation (1), Fm refers to a component of the axial force F due to the weight M of the disc, r refers to a distance from the gravitational axis of the disc to the center of the disc, and $\omega$ refers to the rotation speed of the disc.

From Equation (1), the axial force Fm due to the weight of the disc is in direct proportion to the distance r from the gravitational axis of the disc to the center of the disc and to the square of the rotation speed $\omega$ of the disc.

When the disc is a geometrically eccentric disc whose gravitational axis does not deviate from the center of the disc, the distance r from the gravitational axis of the disc to the center of the disc equals zero. Thus, Fm equals zero, and the axial force F is fixed even if variation occurs in the rotation speed of the disc. That is, the imbalance of the eccentric disc is fixed even if the rotation speed of the eccentric disc is variable. In this case, the disc wobble and the annoying noise can be alleviated by applying a vibration eliminating device or a noise-eliminating device to the optical drive.

On the other hand, when the disc is gravitationally eccentric, the gravitational axis deviates from the center of the disc by a distance r, which is not zero. That is, Fm is in direct proportion to $\omega^2$. Consequently, when the rotation speed of the unbalanced disc is increased, the imbalance of the unbalanced disc is rapidly increased. Thus, the imbalance of the unbalanced disc not only exists in the disc rotation, but is also amplified when the rotation speed of the disc is increased. In this case, even if the above-mentioned vibration eliminating device or noise-eliminating device are applied to the optical drive, the disc wobble and the annoying noise may surpass the limitation of these devices due to the increasing rotation speed.

Consequently, when a gravitationally eccentric disc is applied to the optical drive, data retrieval of the unbalanced disc is performed at a relatively low rotation speed to avoid rapidly increasing imbalance. In this case, a method of unbalanced disc detection must be applied. If the disc is determined to be gravitationally eccentric, the rotation speed of the rotational driving spindle is lowered to alleviate the disc wobble and the annoying noise caused by the imbalance.

Generally, a servo control system of the optical drive, i.e. the slim type optical drive, is used to perform disc detection. An example of the structure of the conventional servo control system of the slim type optical drive is described in detail with reference to FIG. 1.

The servo control system of the optical drive performs focus and tracking control. In FIG. 1, the optical pickup 10 of the optical drive performs data retrieval, and the position signal of the optical pickup 10 is transformed by the front-end processor (FEP) 20 to an analog focusing error signal FE and an analog tracking error signal TE. The analog focusing error signal FE and the analog tracking error signal TE are then transmitted to the digital signal processor (DSP) 30 to digitize the signals to a digital focusing error signal DFE and an off-track signal OFTR. The digital focusing error signal DFE and the off-track signal OFTR are then transmitted to the micro control unit (MCU) 40 for further action, such as focus or tracking control of the optical drive to the optical pickup 10.

The conventional method of unbalanced disc detection applied to the above-mentioned servo control system mainly applies a manner of detecting position deviation of the optical pickup, which corresponds to an incline angle of the optical pickup to the disc. In this case, when disc wobble occurs, the incline angle is variable, and deviation can be determined by the variation in the position deviation of the optical pickup. Thus, the imbalance of the unbalanced disc can be quantified in the form of the variation in the position deviation of the optical pickup.

However, the conventional servo control system of the optical drive does not provide any function that directly obtains the incline angle or the position deviation of the optical pickup. Consequently, either additional electronic components or a specific FEP 20 with additional function are required on the main board of the optical drive to detect the incline angle or the position deviation of the optical pickup. Thus, not only is the cost of the optical drive increased, but the main board of the optical drive m be enlarged, which definitely leads to disadvantage in design and manufacture of the optical drive.

SUMMARY OF THE INVENTION

In view of this, the present invention discloses a method of unbalanced disc detection in a slim type optical drive. The method of the present invention can be applied in the servo control system of the optical drive without any additional electronic components or specific FEPs with additional functions, and the deviation of the disc is assessed by detecting the off-track signal. Thus, the present invention enables the imbalance of the unbalanced disc to be directly obtained with the servo control system without additional cost or size enlargement of the main board, and the slim type optical drive in which the present invention is applied can easily identify if the disc therein is unbalanced or not.

In the present invention, the slim type optical drive obtains a first tracking count per round of the disc at a first rotation speed to obtain a first runout. Then, the optical drive obtains a second tracking count per round of the disc at a second rotation speed to obtain a second runout. Finally, deviation of the disc is assessed according to the first runout and the second runout.

In the method of the present invention, the deviation of the disc can be quantified in direct proportion to the difference between the first runout and the second runout. Further, the disc is checked when the optical drive is set to turn on focus control and turn off tracking control to the disc. In practical use, the first rotation speed refers to a low rotation speed, and the second rotation speed refers to a high rotation speed, so the deviation of the disc can be obtained according to the difference between runout of the low rotation speed and that of the high rotation speed.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

As mentioned in the prior art, a gravitationally eccentric disc has its gravitational axis deviated from the center of the disc, and an axial force F exists between the rotational driving spindle and the holding mechanism of the optical drive and the disc. A component Fm of the axial force F due to the weight of the disc is in direct proportion to the square of the rotation speed $\omega^2$. Since the axial force F of the unbalanced disc is mainly determined by Fm, the invention assumes that F=Fm. Consequently, F is in direct proportion to $\omega^2$.

The present invention relates to a method of unbalanced disc detection in a slim type optical drive. Generally, a plurality of talons is disposed in the slim type optical drive as the disc holding device. Each of the talons has an elastic spring, and the axial force F is applied to the elastic springs of the talons. If each of the elastic springs has an elasticity coefficient K, a relation between compression d of the elastic springs and the axial force F can be shown as Equation (2):

$$F = K \times d \tag{2}$$

Thus, the compression d of the elastic springs is in direct proportion to the axial force F. Since F is in direct proportion to $\omega^2$, it goes without saying that d is in direct proportion to $\omega^2$. That is, the compression of the elastic springs, which refers to a deviation or a "runout" of the optical disc, is in direct proportion to the square of the rotation speed of the disc.

Since the imbalance of the unbalanced disc can be quantified as deviation, which is conventionally determined by the variation in the position deviation of the optical pickup due to the rotation speed, it goes without saying that the unbalanced deviation can be quantified by the variation in the runout of the disc. Consequently, the method of the present invention applies difference of the runout of the disc as the quantified unbalanced deviation, which can be described hereinafter in detail.

Figure 1:
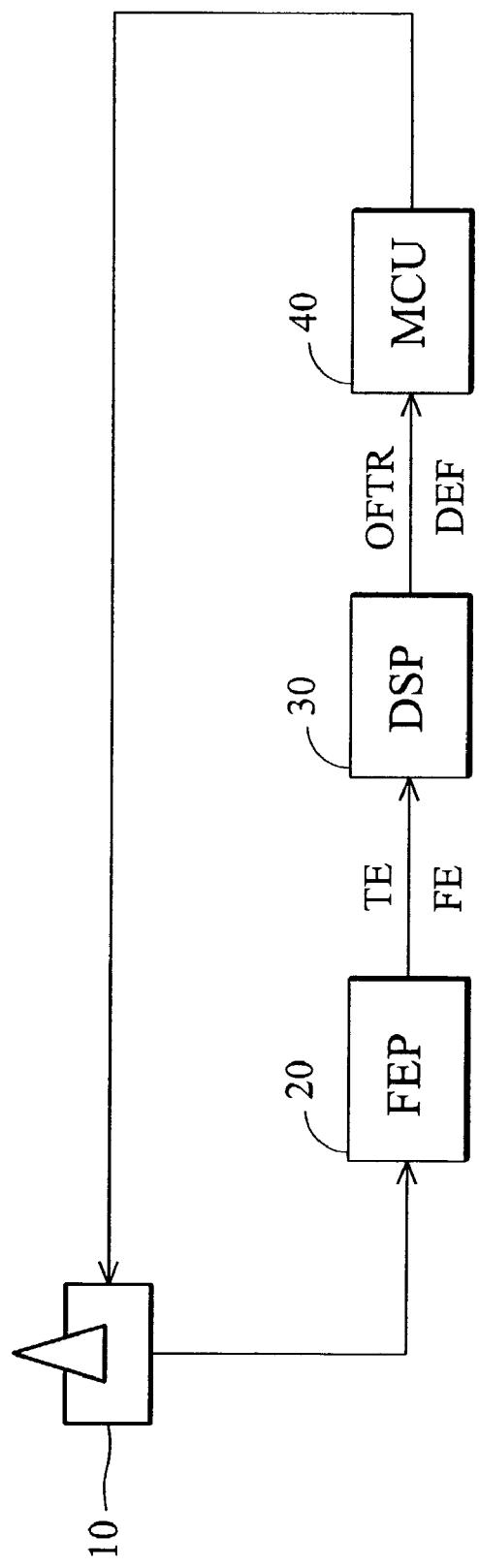
FIG. 1 is a schematic view of a conventional servo control system in a slim type optical drive.

In the method of the present invention, the slim type optical drive has a plurality of talons with elastic springs as mentioned above, and a servo control system as shown in FIG. 1. The servo control system has an optical pickup 10, an FEP 20, a DSP 30, and an MCU 40.

In the servo control system as shown in FIG. 1, the tracking error signal TE obtained by FEP 20 is transformed by the DSP 30 to the digital off-track signal OFTR. In this case, a tracking count, which refers to deviation of the optical pickup 10 from the predetermined track due to the deviation of the disc, can be obtained from variation in the digital off-track signal OFTR. As a result, there is a relation between the runout of the disc and the tracking count within a certain period of time, such as a tracking count per round. An example of the relation is shown in Equation (3):

$$\text{Runout} = \text{the tracking count per round}/4 \tag{3}$$

It should be noted that, when tracking control is turned on, the servo control system controls the optical pickup 10 following the predetermined track. Thus, the digital off-track signal OFTR approaches a constant value. Since the tracking count refers to deviation of the optical pickup 10 from the predetermined track, the tracking count is zero under tracking control. Consequently, it is required to turn the tracking control off to obtain the tracking count.

When the tracking control is turned off and deviation of the disc occurs, the digital off-track signal OFTR is variable, and the tracking count can be obtained. In this case, the runout can be obtained from the tracking count per round, and the unbalanced deviation can be further obtained according to the difference between the runout.

Figure 2:
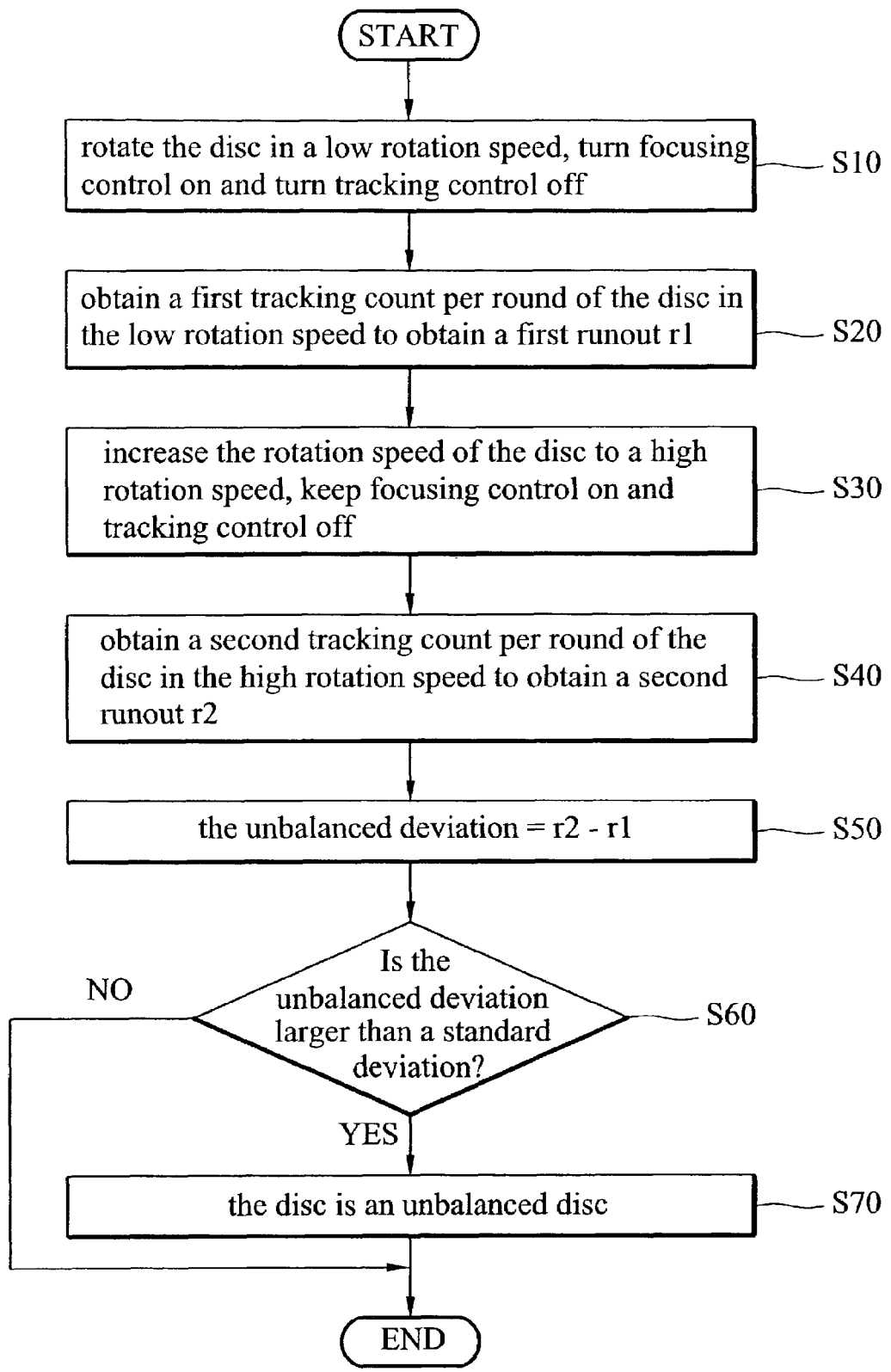
FIG. 2 is a flow chart showing a method of unbalanced disc detection in a slim type optical drive of the present invention.

A detailed description of the method of unbalanced disc detection of the present invention is hereinafter disclosed with reference to the flow chart as shown in FIG. 2.

First, since an optical disc is about to be detected, the disc is disposed in the slim type optical drive. Then, the disc is driven to start rotating by the rotational driving spindle of the optical drive. At this time, the disc is rotated at a first rotation speed (that is, a low rotation speed), the focus control is turned on for data retrieval, and the tracking control is turned off to obtain the off-track signal OFTR (step S10). Then, a first tracking count per round of the disc in the low rotation speed can be obtained, and a first runout r1 (which equals one fourth of the first tracking count per round) is further obtained (step S20).

Then, the rotation speed rotational driving spindle is alleviated to increase the rotation speed of the disc to a second rotation speed (that is, a high rotation speed), and the servo control system keeps the keep focus control on and the tracking control off (step S30). Then, a second tracking count per round of the disc in the high rotation speed can be obtained, and a second runout r1 (which equals one fourth of the second tracking count per round) is further obtained (step S40, which is similar to step S20). Since the first runout r1 and the second runout r2 are obtained, the deviation of the disc can be further obtained according to r1 and r2, i.e. the unbalanced deviation equals the difference between r1 and r2 (step S50).

Once the deviation of the disc is assessed, it can be compared with a standard deviation (step S60) to determine if the disc is gravitationally eccentric or not. For example, if the unbalanced deviation is larger than the standard deviation, the disc can be regarded as a gravitationally eccentric disc (step S70), and the servo control system can perform predetermined follow-up on the unbalanced disc, such as reducing the rotation speed of the rotational driving spindle to prevent from the disc wobble and the annoying noise. On the other hand, if the unbalanced deviation is smaller than the standard deviation, the disc can be regarded as a regular balanced disc, and no further operation is required.

In the above-mentioned description of the method of the present invention, the deviation of the disc is quantified to be the difference between the first runout and the second runout. However, the runout of the disc may vary due to the relation between the runout of the disc and the tracking count per round (i.e. the runout in the above-mentioned embodiment is a quarter of the tracking count per round). Consequently, the deviation of the disc can be determined in direct proportion to the difference between the first runout and the second runout.

Further, since there are various types of optical discs in the market, the standard deviation of each type of optical disc varies and can be preset, and the limitation of the rotation speed can be determined by experiments.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of unbalanced disc detection in a slim type optical drive, comprising the steps of:
    obtaining a first tracking count per round of the disc at a first rotation speed to obtain a first runout;
    obtaining a second tracking count per round of the disc at a second rotation speed to obtain a second runout; and
    obtaining deviation of the disc according to the first runout and the second runout.

2. The method of unbalanced disc detection according to claim 1, wherein the deviation of the disc is in direct proportion to the difference between the first runout and the second runout.

3. The method of unbalanced disc detection according to claim 1, wherein the disc is checked when the optical drive is set to turn on focus control and turn off tracking control to the disc.

4. The method of unbalanced disc detection according to claim 1, wherein the first rotation speed is a low rotation speed, and the second rotation speed is a high rotation speed.

* * * * *